(12) United States Patent
Mukherjee et al.

(10) Patent No.: US 7,353,365 B2
(45) Date of Patent: Apr. 1, 2008

(54) IMPLEMENTING CHECK INSTRUCTIONS IN EACH THREAD WITHIN A REDUNDANT MULTITHREADING ENVIRONMENTS

(75) Inventors: Shubhendu S. Mukherjee, Framingham, MA (US); Joel S. Emer, Acton, MA (US); Steven K. Reinhardt, Ann Arbor, MI (US); Christopher T. Weaver, Marlboro, MA (US)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 10/953,887

(22) Filed: Sep. 29, 2004

(65) Prior Publication Data

US 2006/0095821 A1 May 4, 2006

(51) Int. Cl.
*G06F 9/318* (2006.01)
(52) U.S. Cl. .................. 712/218; 712/218; 712/228
(58) Field of Classification Search .............. 712/218, 712/228
See application file for complete search history.

(56) References Cited

U.S. PATENT DOCUMENTS 6,356,795 B1    3/2002   Barthel et al.
6,463,579 B1 *  10/2002  McKinsey ............... 717/146
6,640,313 B1    10/2003  Quach 2001/0034824 A1  10/2001  Mukherjee et al.
2001/0037445 A1  11/2001  Mukherjee

OTHER PUBLICATIONS

T. Vijaykumar, I. Pomeranz, and K. Cheng. Transient-fault recovery using simultaneous multithreading. In Proceedings of the 29th Annual International Symposium on Computer Architecture, pp. 87-98, May 2002.*
European Patent Office, International Search Report and Written Opinion for International Patent Application No. PCT/US2005/035375, 14 pages, Apr. 6, 2006.
Steven K. Reinhardt et al., "Transient Fault Detection via Simultaneous Multithreading," Computer Architecture News, vol. 28, No. 2, May 2000, pp. 25-36.
T.N. Vijaykumar et al., "Transient-Fault Recovery Using Simultaneous Multithreading," Proceedings of the 29th Annual International Symposium on Computer Architecture, May 2002, pp. 87-98.

* cited by examiner

*Primary Examiner*—Donald Sparks
*Assistant Examiner*—Vincent Lai

(57) ABSTRACT

A method and apparatus for a checker instruction in a redundant multithreading environment is described. In one embodiment, when RMT requires, a processor may issue a checker instruction in both a leading thread and a trailing thread. The checker instruction may travel down individual pipelines for each thread independently until it reaches a buffer at the end of each pipeline. Then, prior to committing the checker instruction, the checker instruction looks for its counterpart and does a comparison of the instructions. If the checker instructions match, the checker instructions commit and retires otherwise an error is declared.

27 Claims, 6 Drawing Sheets

IMPLEMENTING CHECK INSTRUCTIONS IN EACH THREAD WITHIN A REDUNDANT MULTITHREADING ENVIRONMENTS

BACKGROUND INFORMATION

Current redundant-execution systems commonly employ a checker circuit that is self-checking and is implemented in hardware. Similar to the checker circuit is the compare instruction that would compare the results from two threads (e.g., store address and data). It may be possible to duplicate the compare instruction in both threads to get the effect of self-checking via duplication.

Unfortunately, by duplicating the compare instruction the architecture would lose the performance advantage of redundant multithreading (RMT). RMT's performance advantage comes from having the leading and trailing threads sufficiently apart such that the leading thread can prefetch cache misses and branch mispredictions for the trailing thread. If the compare instruction is duplicated, not only are additional queues needed, incurring higher overhead, but also the architecture would be unable to keep the two threads sufficiently apart because of the synchronization required in both directions. Thus what is needed is an instruction that can achieve lower failure rate without sacrificing the performance advantage of RMT.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

Method and apparatuses for a checker instruction in a redundant multithreading environment are described. In the following description, for purposes of explanation, numerous specific details are set forth in order to provide a through understanding of the invention. It will be apparent, however, to one skilled in the art that the invention can be practiced without these specific details.

Figure 1:
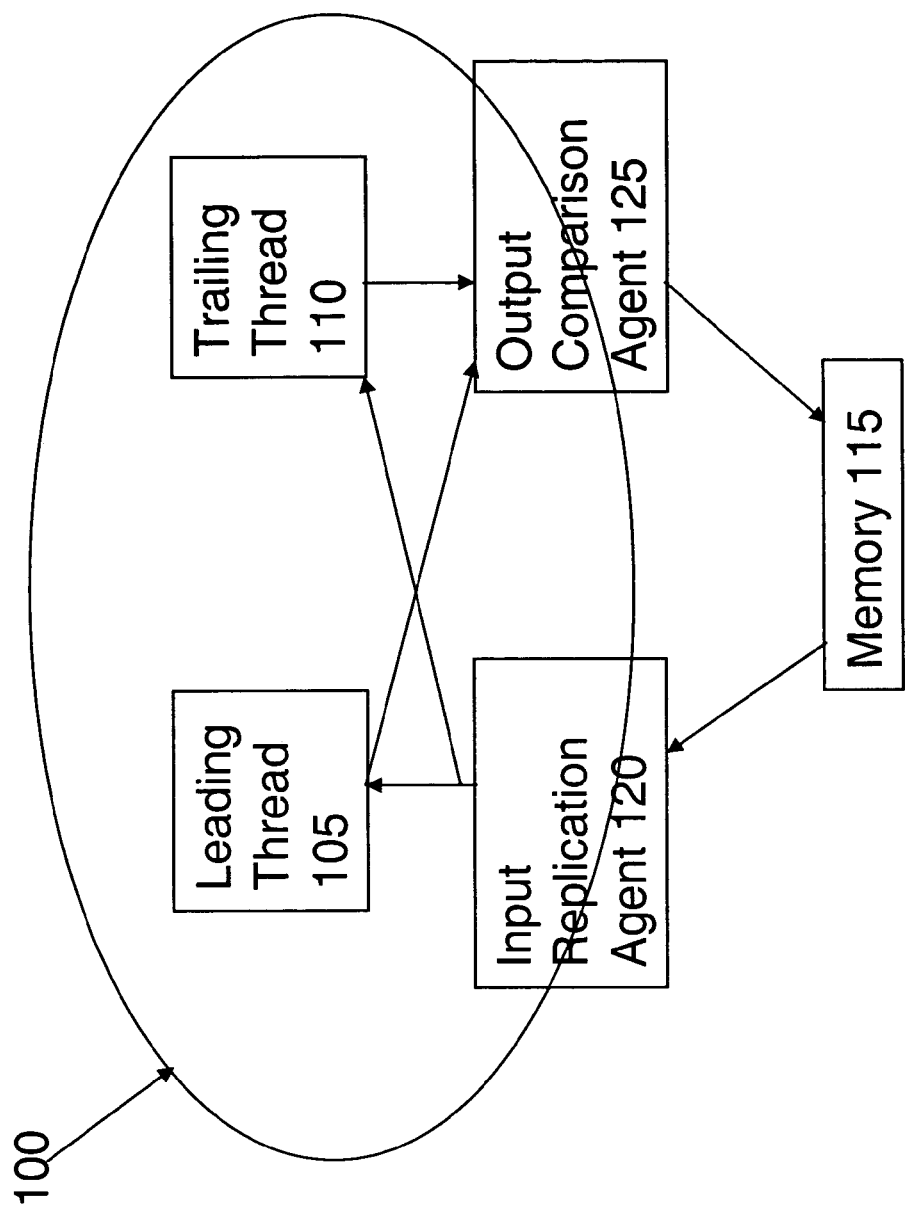
FIG. 1 is a block diagram of one embodiment of a multithreaded architecture.

FIG. 1 is a block diagram of one embodiment of a redundantly multithreaded architecture. In a redundantly multithreaded architecture faults can be detected by executing two copies of a program as separate threads.

Each thread is provided with identical inputs and the outputs are compared to determine whether an error has occurred. Redundant multithreading can be described with respect to a concept referred to herein as the "sphere of replication." The sphere of replication is the boundary of logically or physically redundant operation.

Components within the sphere of replication 100 (e.g., a processor executing leading thread 105 and a processor executing trailing thread 110) are subject to redundant execution. In contrast, components outside sphere of replication 100 (e.g., memory 115) are not subject to redundant execution. Fault protection is provided by other techniques, for example, error correcting code for memory 115. Other devices may be outside of sphere of replication 100 and/or other techniques can be used to provide fault protection for devices outside of sphere of replication 100.

Data entering sphere of replication 100 enter through input replication agent 120 that replicates the data and sends a copy of the data to leading thread 105 and to trailing thread 110. Similarly, data exiting sphere of replication 100 exit through output comparison agent 125 that compares the data and determines whether an error has occurred. Varying the boundary of sphere of replication 100 results in a performance versus amount of hardware tradeoff. For example, replicating memory 115 would allow faster access to memory by avoiding output comparison of store instructions, but would increase system cost by doubling the amount of memory in the system.

One embodiment of the present invention proposes a mechanism to check a checker circuit in a software implementation of RMT. Because RMT compares outputs of committed instructions (requiring instruction-by-instruction comparison), it may also be implemented in software. If the software implementation of RMT compared every instruction, it would incur significant overhead. Instead, however, RMT allows the comparison of only store instructions and replication of only load instructions, which may significantly reduce the software overhead of an RMT implementation.

Figure 2:
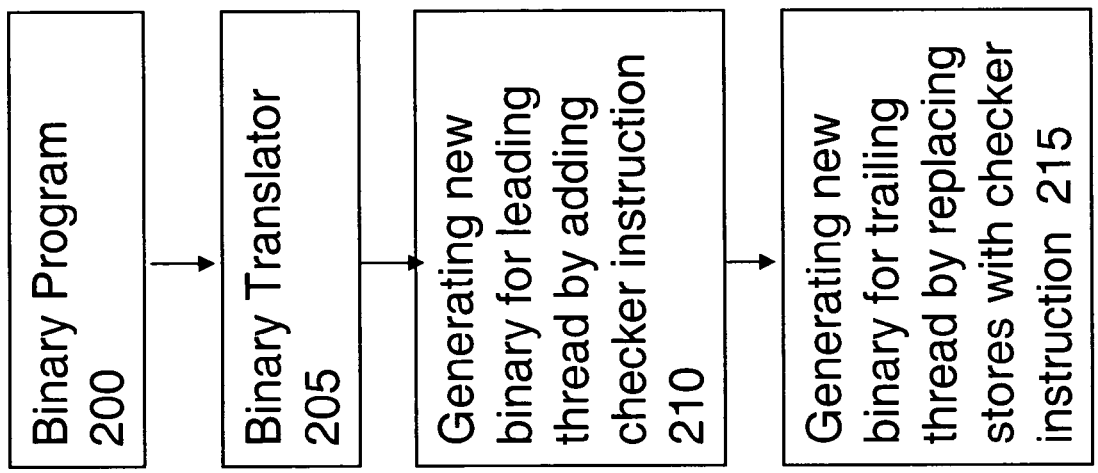
FIG. 2 is a flowchart illustrating one method of generating a checker instruction.

FIG. 2 illustrates one method of generating a checker instruction. Initially, as in most computers, a complier generates instructions. From the complier, the computer now has a binary program which may be, but not limited to, a sequence of store instructions 200. Next, a binary translator may insert a checker instruction prior to each store instruction in the binary program 205. The binary translator may be any binary translator well known in the art. Upon translating the binary program, the system creates a binary program for both the leading thread and the trailing thread. The binary program for the leading thread adds the checker instruction to the store instruction 210. The binary program for the trailing thread replaces the store instruction with the peer checker instruction of the leading thread 215.

Figure 3:
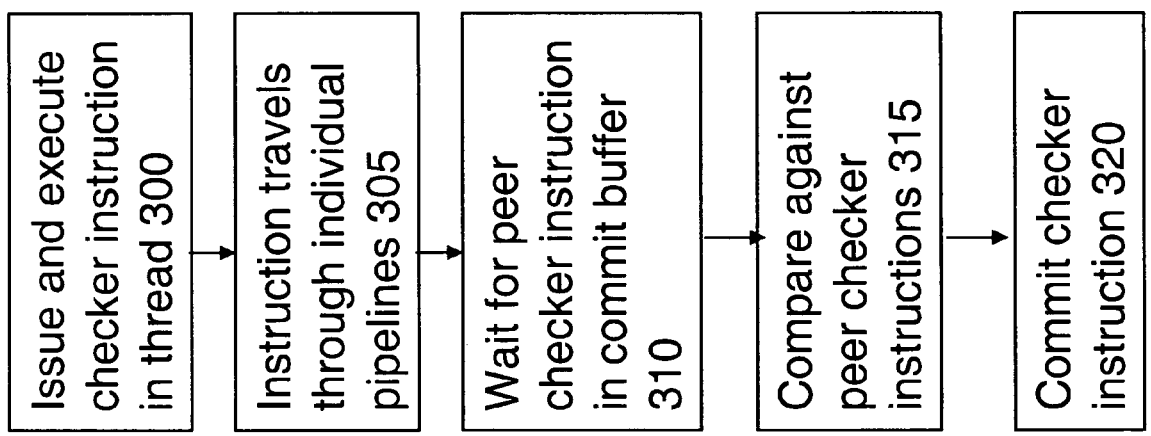
FIG. 3 is a flowchart illustrating one implementation of a checker instruction in either thread.

FIG. 3 illustrates one implementation of the checker instruction. When RMT requires a compare, a processor may issue a checker instruction in both the leading thread and the trailing thread 300. Each checker instruction may carry a 64-bit quantity from each thread. The checker instruction may travel down individual pipelines for each thread independently 305 until it reaches a buffer at the end of each pipeline. The checker instruction waits for its peer checker instruction in the buffer 310. These two checker instructions may then do a comparison of the 64-bit quantities they are carrying 315. On a mismatch, both may report errors. On a match, they may let the processors commit the checker instruction 320. The pipelines can be from different processors in a CMP or from the same multithreaded processor as in a SMT processor.

In this implementation, the checker instruction does not hold up the leading instruction from processing instructions from the instruction queue. Rather, it only holds up the retire pointer till the corresponding checker instruction from the trailing thread shows up. Also, if the environment is not a RMT environment, then the checker instruction may be treated as a NOP.

Figure 4:
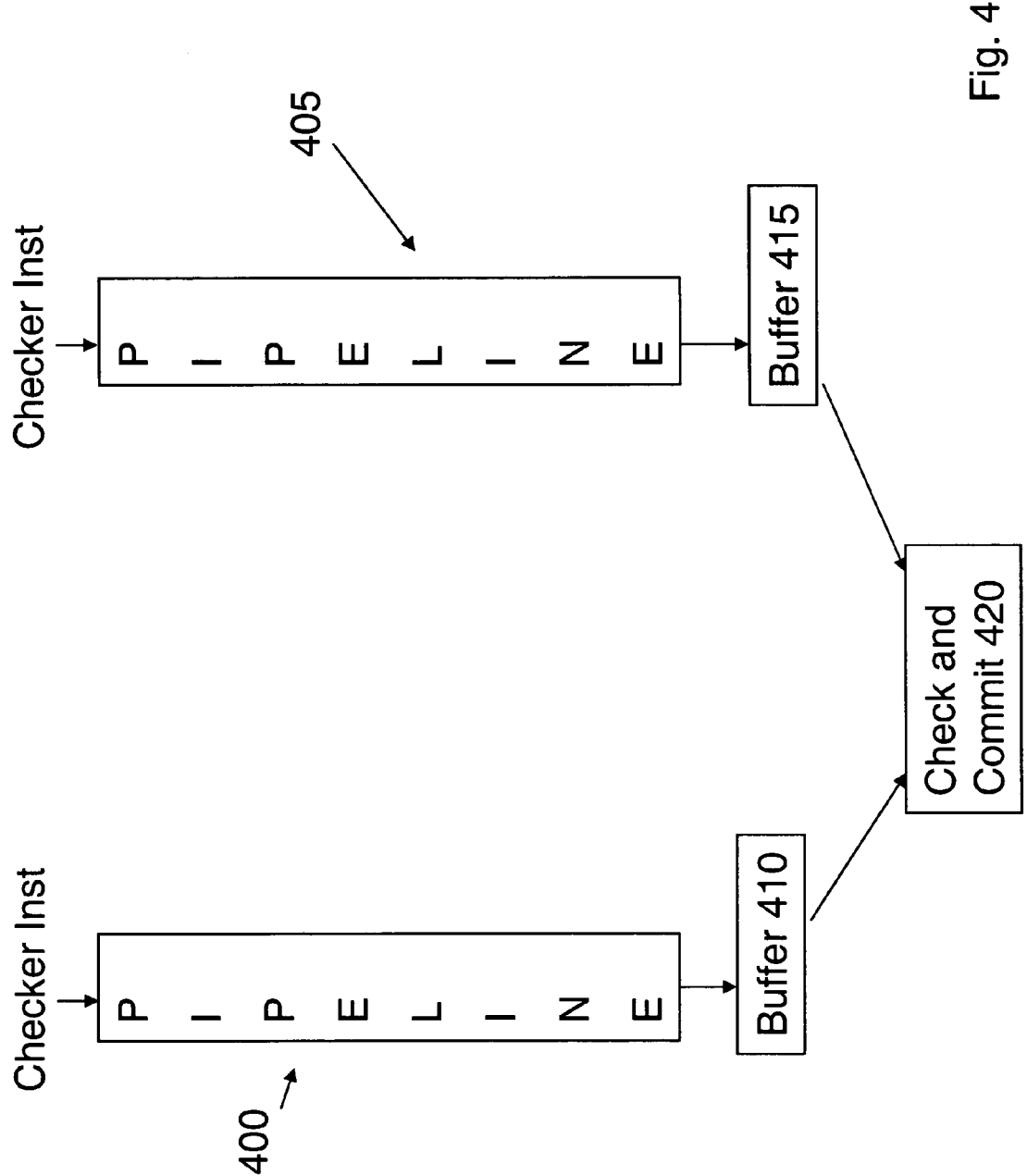
FIG. 4 is a block diagram of one embodiment of a checker instruction.

FIG. 4 is a block diagram of one example of a checker instruction flowing through two pipelines. Assuming a store instruction: R1→[R2], stores the value in register R1 to the memory location pointed by the address in register R2. This store instruction may be replicated in both the leading thread and the trailing thread with the checker instruction. The store instruction in the leading thread may include both the checker instruction and the store instruction as shown below:
Checkerinst R1
Checkerinst R2
Store: R1→[R2]. Thus, the leading thread may contain the checker instruction along with the store instruction when traveling through its pipeline 400.

The store instruction in the trailing thread may include only the checker instruction as shown below:
Checkerinst R1
Checkerinst R2. Thus, the trailing thread does not have the store instruction traveling through its pipeline 405.

The checkerinst R1 from the leading thread in pipeline 400 waits for peer checker instruction in buffer 410. The checkerinst R1 from the trailing thread in pipeline 405 waits for it peer checker instruction in buffer 415. The checker instruction always looks or waits for its counterpart or peer. If there is a mirror thread, the checker instruction will look or wait for the thread in the buffers 410, 415 to make sure the mirror thread is there and then compares the checker instructions.

The checkerinst R1 from the leading thread and checkerinst R1 from the trailing thread may pair up, due to commit order, and compare the register specifier and value of R1 to ensure that the registers did not have any errors in them. If no errors are found, the checker instructions commit 420. Once the checker instructions commit, the value of R1 is stored. The value of R1 is carried through to the commit point and then stored. Thus, the system is able to check all the stores simultaneously instead store by store as done previously.

Figure 5:
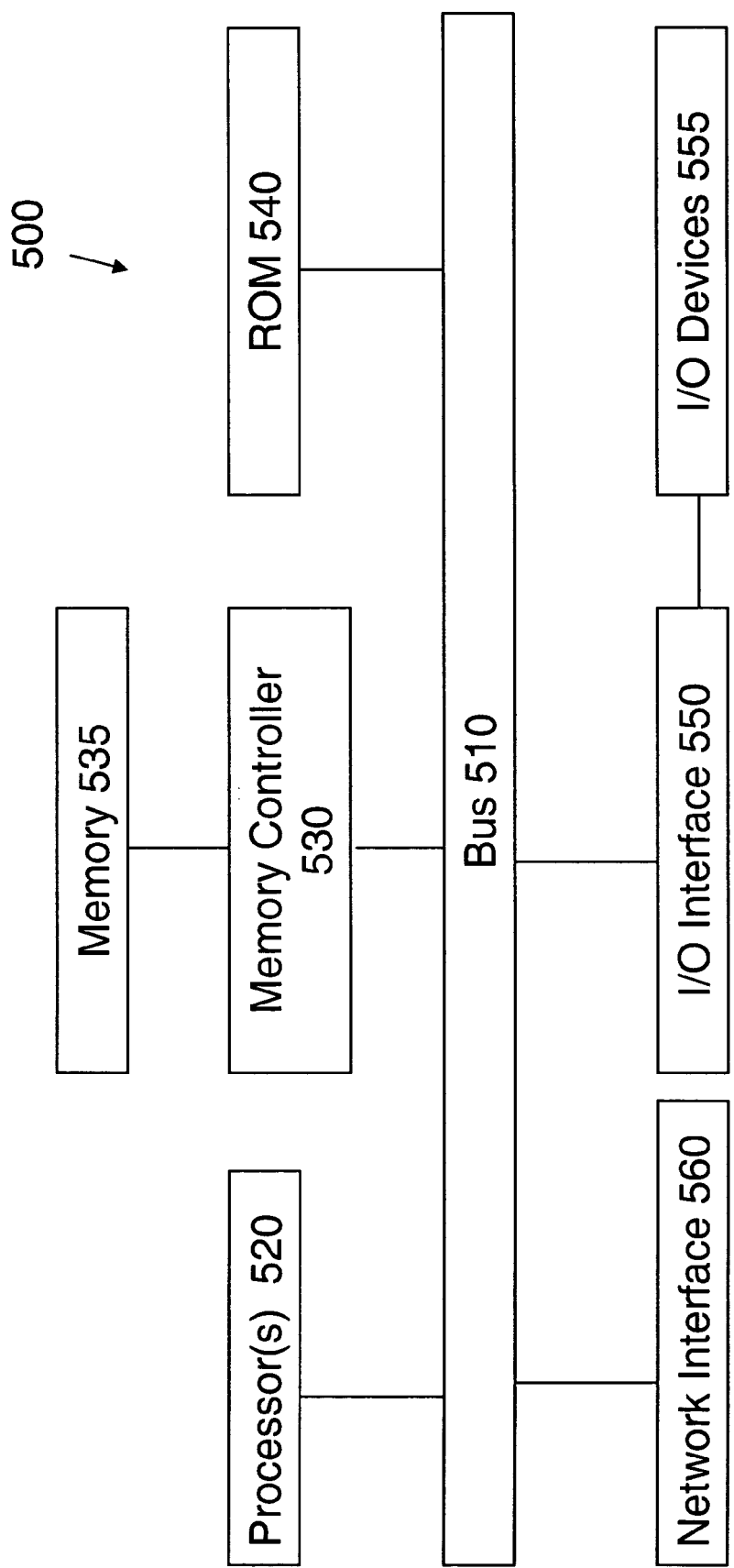
FIG. 5 is a block diagram of a system that may provide an environment for multithreaded processors.

FIG. 5 is a block diagram of a system that can provide an environment for multithreaded processors. The system illustrated in FIG. 5 is intended to represent a range of systems. Alternative systems may include more, fewer and/or different components.

System 500 includes bus 510 or other communication device to communicate information, and processor(s) 520 coupled to bus 510 to process information. System 500 further includes random access memory (RAM) or other dynamic memory as well as static memory, for example, a hard disk or other storage device 535 (referred to as memory), couple to bus 510 via memory controller 530 to store information and instructions to be executed by processor(s) 520. Memory 535 also can be used to store temporary variables or other intermediate information during execution of instructions by processor(s) 520. Memory controller 530 can include one or more components to control one or more types of memory and/or associated memory devices. System 500 also includes read only memory (ROM) and/or other static storage device 540 coupled to bus 510 to store static information and instructions for processor(s) 520.

System 500 can also be coupled via a bus 510 to input/output (I/O) interface 550. I/O interface 550 provides an interface to I/O devices 555, which can include, for example, a cathode ray tube (CRT) or liquid crystal display (LCD), to display information to a computer user, an alphanumeric input device including alphanumeric and other keys and/or a cursor control device, such as a mouse, a trackball, or cursor direction keys. System 500 further includes network interface 560 to provide access to a network, such as a local area network, whether wired or wireless.

Instructions are provided to memory 535 from a storage device, such as magnetic disk, a read-only memory (ROM) integrated circuit, CD_ROM, DVD, via a remote connection (e.g., over a network via network interface 860) that is either wired or wireless, etc.

Figure 6:
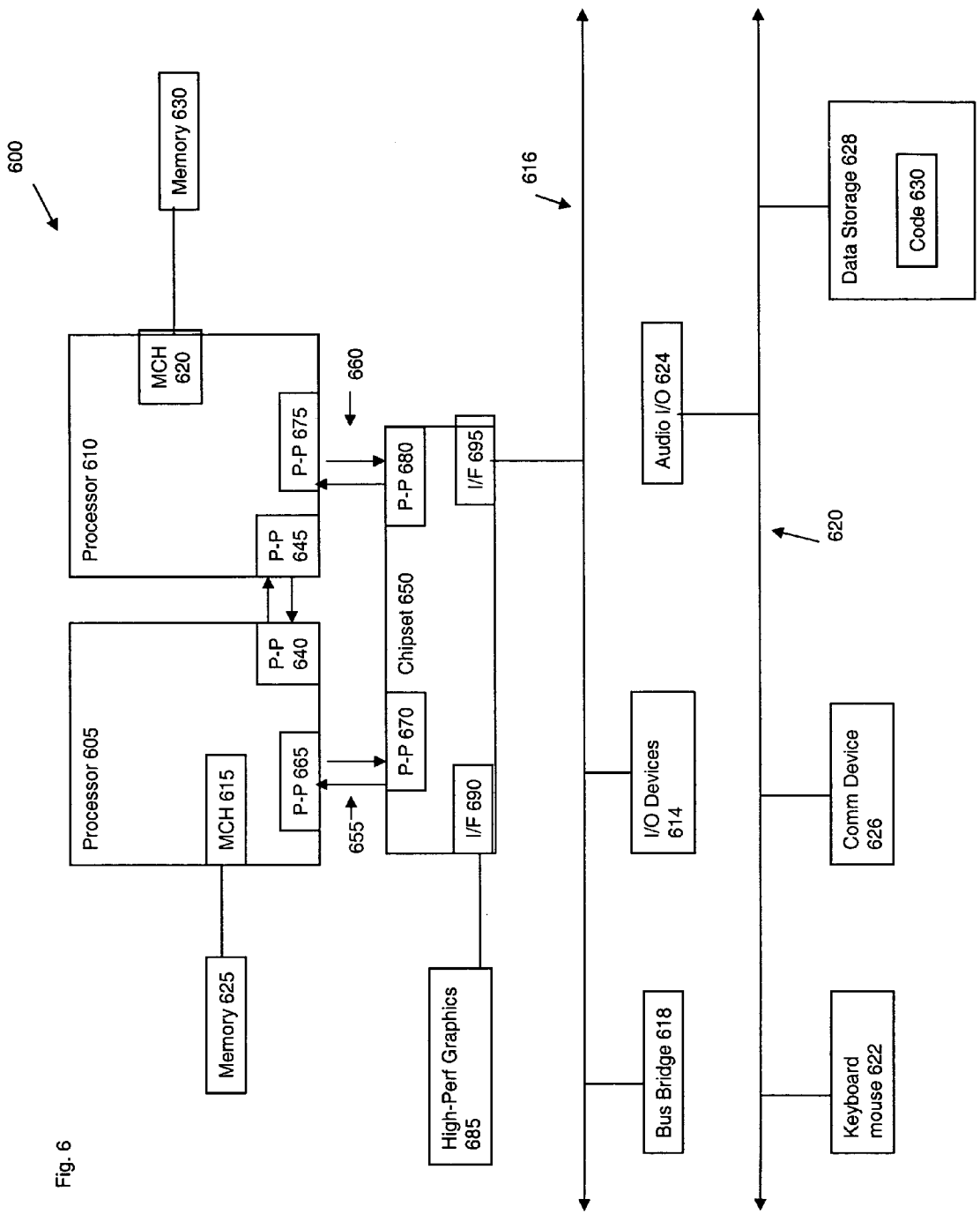
FIG. 6 is a block diagram of an alternative system that may provide an environment for multithreaded processors.

Referring now to FIG. 6, the system 600 generally shows a system where processors, memory, and input/output devices are interconnected by a number of point-to-point interfaces. The system 600 may also include several processors, of which only two, processors 605, 610 are shown for clarity. Processors 605, 610 may each include a local memory controller hub (MCH) 615, 620 to connect with memory 625, 630. Processors 605, 610 may exchange data via a point-to-point interface 635 using point-to-point interface circuits 640, 645. Processors 605, 610 may each exchange data with a chipset 650 via individual point-to-point interfaces 655, 660 using point to point interface circuits 665, 670, 675, 680. Chipset 650 may also exchange data with a high-performance graphics circuit 685 via a high-performance graphics interface 690.

The chipset 650 may exchange data with a bus 616 via a bus interface 695. In either system, there may be various input/output I/O devices 614 on the bus 616, including in some embodiments low performance graphics controllers, video controllers, and networking controllers. Another bus bridge 618 may in some embodiments be used to permit data exchanges between bus 616 and bus 620. Bus 620 may in some embodiments be a small computer system interface (SCSI) bus, an integrated drive electronics (IDE) bus, or a universal serial bus (USB) bus. Additional I/O devices may be connected with bus 620. These may include keyboard and cursor control devices 622, including mouse, audio I/O 624, communications devices 626, including modems and network interfaces, and data storage devices 628. Software code 630 may be stored on data storage device 628. In some embodiments, data storage device 628 may be a fixed magnetic disk, a floppy disk drive, an optical disk drive, a magneto-optical disk drive, a magnetic tape, or non-volatile memory including flash memory.

Throughout the specification, the term, "instruction" is used generally to refer to instructions, macro-instructions, instruction bundles or any of a number of other mechanisms used to encode processor operations.

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

What is claimed is:

1. A method comprising:
generating checker instructions in a leading thread and a trailing thread;
waiting for a peer checker instruction from the leading thread and the trailing thread; and
comparing the peer checker instructions from the leading thread and the trailing thread, wherein the leading thread includes the checker instruction and a selected instruction and the trailing thread includes the checker instruction.

2. The method of claim 1 wherein the generating checker instruction in leading thread further includes inserting the checker instruction prior to the selected instruction.

3. The method of claim 1 wherein the checker instructions travel through corresponding pipelines for the leading thread and trailing thread.

4. The method of claim 1 further comprising committing the checker instructions.

5. The method of claim 4 further comprising storing the selected instruction for the leading thread if the comparing the corresponding checker instructions from the leading thread and the trailing thread match.

6. The method of claim 1 wherein the leading thread and the trailing thread are executed by a single processor.

7. The method of claim 1 wherein the leading thread and the trailing thread are executed by multiple processors.

8. An apparatus comprising:
leading thread circuitry to execute a leading thread of instructions;
trailing thread circuitry to execute a trailing thread of instructions; and
a commit unit to commit corresponding checker instructions from the leading thread and the trailing thread, wherein the leading thread of instructions comprises checker instructions and selected instructions.

9. The apparatus of claim 8 wherein the trailing thread of instructions comprises checker instructions.

10. The apparatus of claim 9 further comprising buffers coupled to the leading thread circuitry and the trailing thread circuitry.

11. The apparatus of claim 10 wherein the checker instruction of the leading thread and the checker instruction of the trailing thread wait for corresponding checker instructions in the buffer.

12. The apparatus of claim 8 wherein the leading thread circuitry and trailing thread circuitry include a pipeline.

13. The apparatus of claim 12 wherein the leading thread and trailing thread are executed by a single processor.

14. The apparatus of claim 12 wherein the leading thread and the trailing thread are executed by multiple processors.

15. The apparatus of claim 8 wherein the selected instruction is stored if the corresponding checker instructions match.

16. The apparatus of claim 15 wherein the commit unit generates an error if the corresponding checker instructions do not match.

17. The apparatus of claim 8 wherein the checker instruction is placed prior to the selected instruction by a binary translator.

18. The apparatus of claim 8 wherein the selected instruction is a store instruction.

19. A system comprising:
a first processor comprising:
leading thread circuitry to execute a leading thread of checker instructions;
trailing thread circuitry to execute a trailing thread of the checker instructions; and
a retire unit to retire corresponding checker instructions from the leading thread and the trailing thread, wherein the leading thread of instructions comprises checker instructions and selected instructions
a first interface to a second processor;
a second interface to input/output devices; and
an audio input-output device coupled to the second interface.

20. The system of claim 19 wherein the trailing thread of instructions comprises checker instructions.

21. The system of claim 20 wherein the selected instructions are stored if the corresponding checker instructions from the leading thread and the trailing thread match.

22. The system of claim 21 further comprising buffers coupled with the leading thread circuitry and the trailing thread circuitry.

23. The system of claim 21 wherein the retire unit generates an error if the corresponding checker instructions do not match.

24. The system of claim 19 wherein the leading thread circuitry and trailing thread circuitry include a pipeline.

25. The system of claim 19 wherein the checker instruction is place prior to the selected instruction by a binary translator.

26. The system of claim 19 wherein the selected instruction is a store instruction.

27. The system of claim 19 wherein the first and second interfaces are point to point interfaces.

* * * * *